United States Patent
Fliege et al.

(10) Patent No.: US 6,905,161 B2
(45) Date of Patent: Jun. 14, 2005

(54) SLIDING-BOW FOLDING UP

(75) Inventors: Dieter Fliege, Remscheid (DE); Roger Remmel, Remscheid (DE); Josef Drasch, Winzer (DE)

(73) Assignee: Edscha LKW-Schiebeverdecke GmbH, Remscheid (DE)

( * ) Notice: Subject to any disclaimer, the term of this patent is extended or adjusted under 35 U.S.C. 154(b) by 0 days.

(21) Appl. No.: 10/179,343

(22) Filed: Jun. 24, 2002

(65) Prior Publication Data

US 2002/0167193 A1 Nov. 14, 2002

Related U.S. Application Data

(63) Continuation of application No. 09/786,096, filed on Jun. 4, 2001, now abandoned.

(30) Foreign Application Priority Data

Sep. 1, 1998 (DE) .......................................... 198 39 820

(51) Int. Cl.$^7$ ................................................. B60P 7/04
(52) U.S. Cl. ............................ 296/100.18; 296/100.12; 296/100.15; 296/100.16
(58) Field of Search ........................... 296/125, 100.11, 296/100.18, 100.17, 181, 100.12, 100.13, 100.14, 100.15, 100.16

(56) References Cited

U.S. PATENT DOCUMENTS

| | | | | |
|---|---|---|---|---|
| 1,845,829 A | * | 2/1932 | Carnal | |
| 2,487,427 A | * | 11/1949 | Drake et al. | |
| 4,353,399 A | * | 10/1982 | Harris | |
| 5,033,347 A | * | 7/1991 | Hillestad et al. | |
| 5,524,953 A | * | 6/1996 | Shaer | |
| 5,538,313 A | | 7/1996 | Henning | 296/100 |
| 6,183,036 B1 | * | 2/2001 | Coulson | |
| 6,616,211 B2 | * | 9/2003 | Cramaro | 296/100.15 |
| 6,634,697 B1 | * | 10/2003 | Petelka | 296/100.12 |

OTHER PUBLICATIONS

MAFCA—Industries—Extract from Brochure (1 page), no date.

* cited by examiner

*Primary Examiner*—Jason Morrow
(74) *Attorney, Agent, or Firm*—Davidson, Davidson & Kappel, LLC

(57) ABSTRACT

A tarpaulin bow cover system for vehicle such as lorries or trailers includes a number of U-shaped bow members which cover the width of a loading platform of the vehicle and for opening or closing the cover by means of rollers or roller trolleys can be displaced in the longitudinal direction of the loading platform along running or guide rails positioned along the two lateral sides of the loading platform. When the cover system is closed the bow members on their bow elements, which define an upper limit, support a tarpaulin which covers the loading platform or the loading area of the vehicle. A first terminal bow member is immovably fixed to a face end of the loading platform and a second mobile terminal bow member is assigned to at least one fixing or locking device which is positioned at the other end of the loading platform. At least one U-shaped auxiliary bow member, which can be pivoted in a limited angular area about an axis of articulation parallel to the plane of the bow member, is arranged at the level of the bow member and the length of the legs of the auxiliary bow member is greater than the distance between the axis of articulation and the bow element of the corresponding bow member.

47 Claims, 10 Drawing Sheets

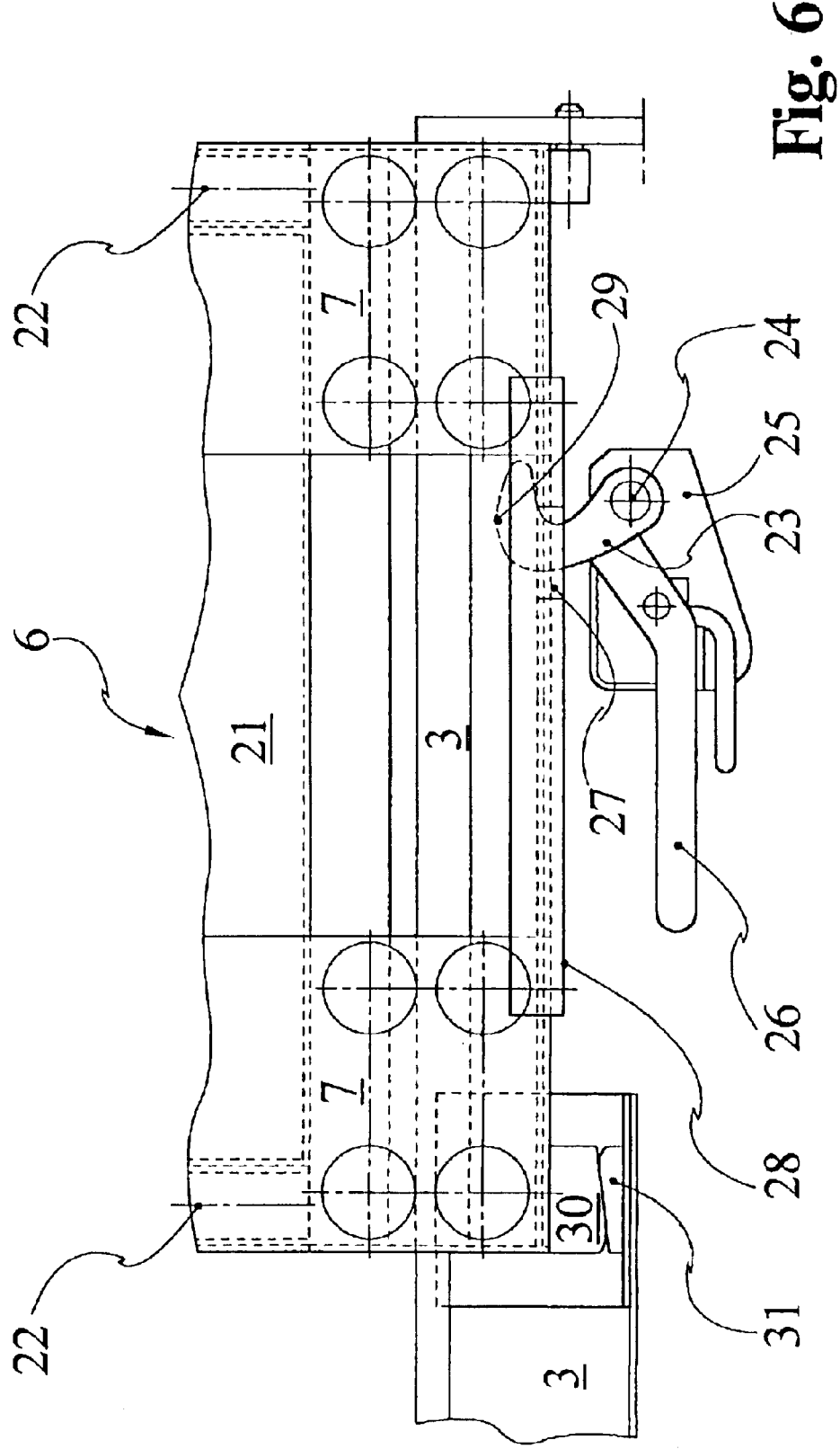

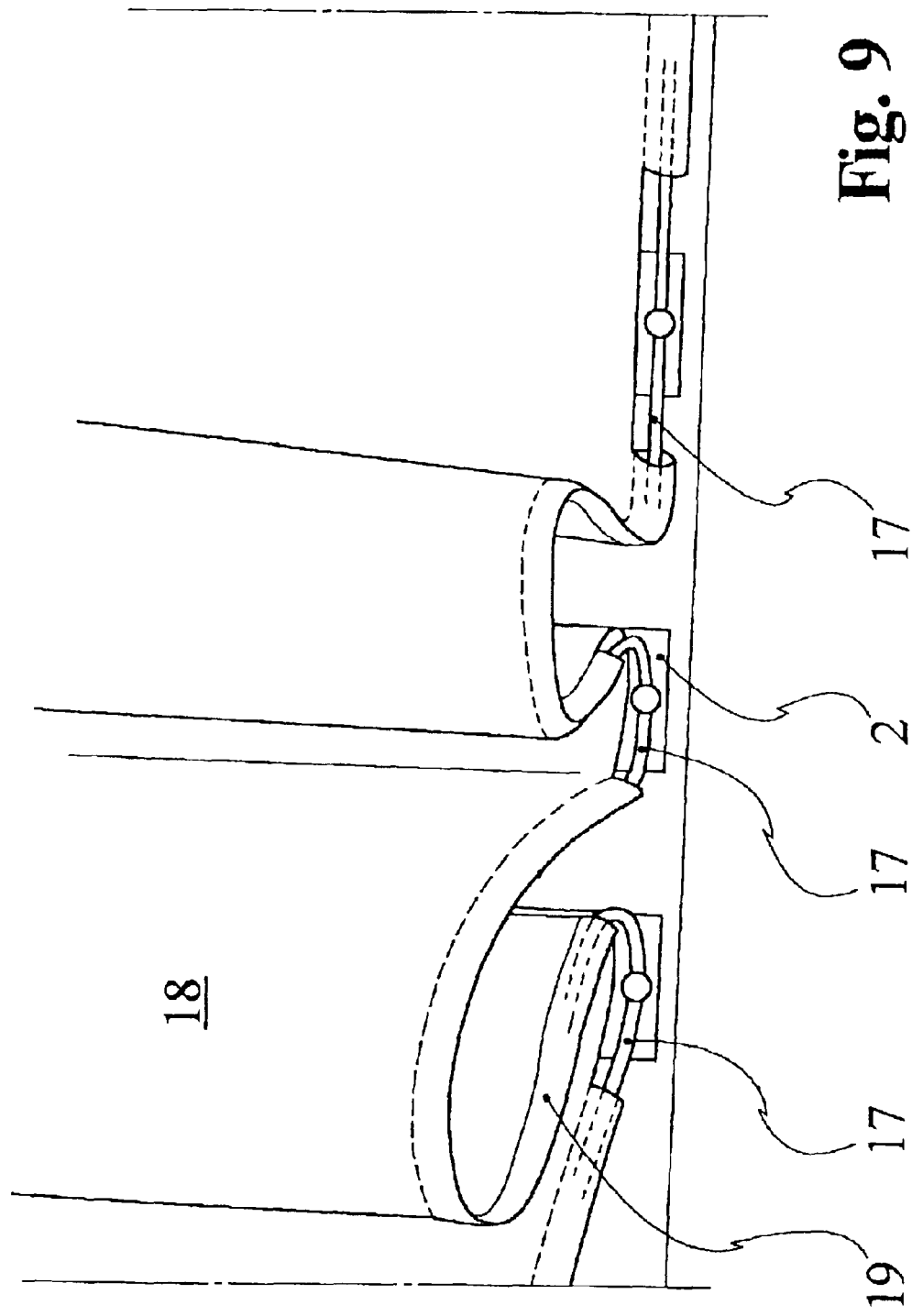

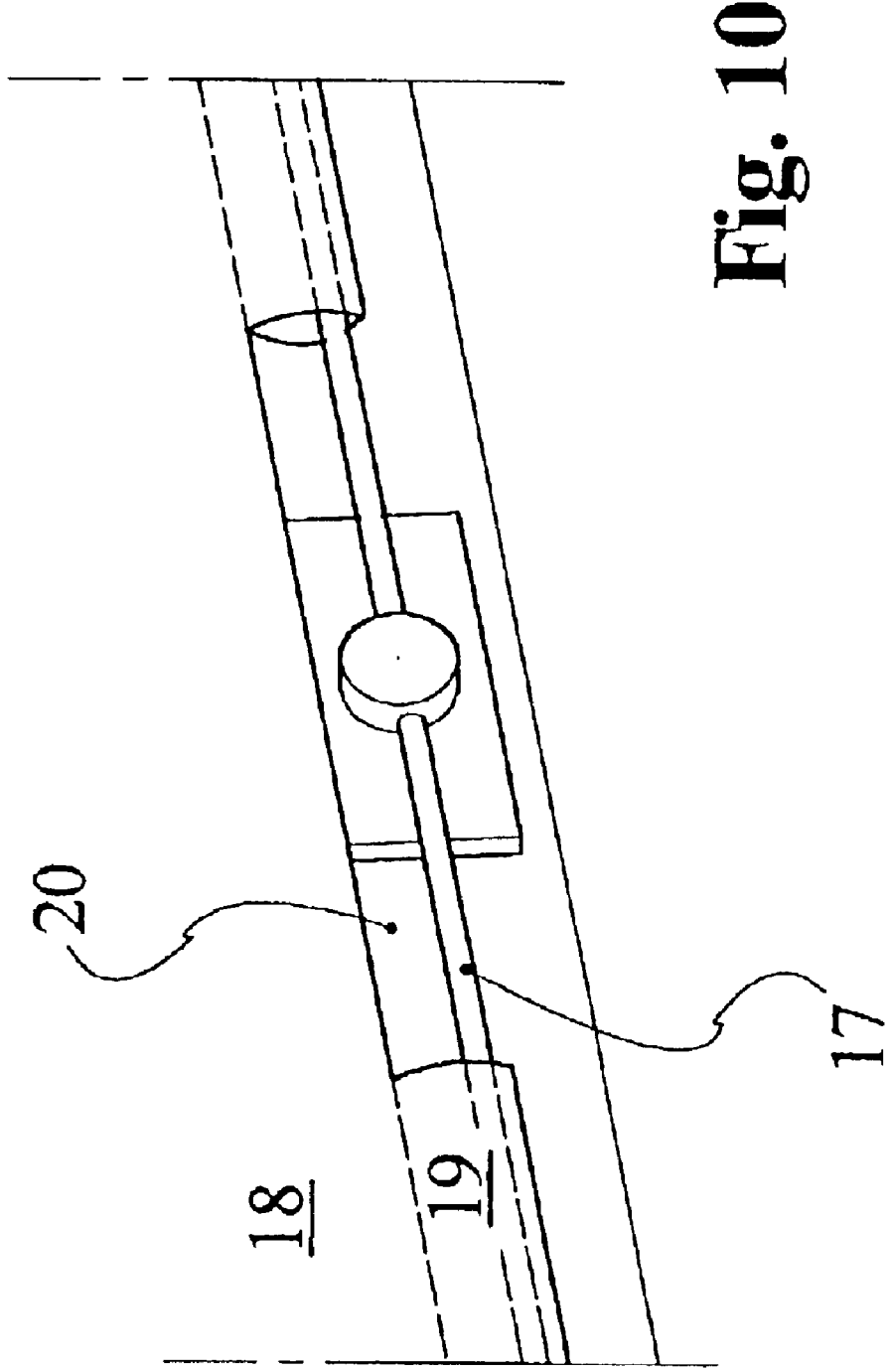

SLIDING-BOW FOLDING UP

CROSS-REFERENCE TO RELATED APPLICATION

The present application is a continuation of U.S. Ser. No. 09/786,096 filed Jun. 4, 2001 abandoned.

BACKGROUND OF THE INVENTION

The present invention relates to a sliding-bow folding top for vehicles, such as lorries or trailers, comprising a number of U-shaped sliding bows which span the width of a loading platform of the vehicle and, for the opening and the closing of the folding top, can be displaced in the longitudinal direction of the loading platform by means of rollers or roller carriages on running and guide rails arranged along the two longitudinal sides of the loading platform, the said sliding bows carrying, on their bow parts which define an upper boundary, a tarpaulin which, when the folding top is closed, covers the loading platform or the loading compartment of the vehicle, wherein a first end bow is arranged in a fixed maimer on the one end of the loading platform and a second, movable end bow is assigned at least to one securing or locking device arranged at the other end of the loading platform.

U.S. Pat. No. 4,259,346 describes a sliding-bow folding top which has simple, U-shaped sliding bows which can be pushed together relative to one another and carry a tarpaulin, and which is suitable for relatively small folding-top lengths.

U.S. Pat. No. 4,711,484 describes a type of sliding-bow folding top which is suitable for lorries and trailers and is distinguished by a multiplicity of U-shaped sliding bows which are supported in a manner such that they can be moved longitudinally via roller carriages on running and guide rails arranged at the sides of the loading platform, and support a tarpaulin covering a loading compartment above the loading platform. The tarpaulin is connected to the sliding bows and is intended to be automatically folded during the opening of the folding top and as the sliding bows are being pushed together. Because of the lack of apparatuses suitable for this, in the case of a sliding-bow folding top of this type it is not in any case possible for controlled folding of the tarpaulin between the sliding bows which have been pushed together to be achieved if the number of sliding bows which are used is reduced to a number which ensures the opening up of at least three quarters of the length of the loading platform when the sliding-bow folding top is opened.

SUMMARY OF THE INVENTION

It is an object of the invention to provide a sliding-bow folding top which achieves controlled folding of the tarpaulin between the sliding bows which have been pushed together with sufficient opening up of the loading platform when the folding top is open.

In the case of the sliding-bow folding top mentioned at the begining, this object may be achieved by the present invention in that at least one U-shaped auxiliary bow is arranged on the sliding bow, which auxiliary bow can be pivoted through a limited angular range about an axis of articulation parallel to the plane of the sliding bow, and that the limb length of the auxiliary bow is greater than the distance of the axis of articulation from the how part of the associated sliding bow.

By this means, a sliding-bow folding top is advantageously provided which ensures controlled folding of the tarpaulin between the sliding bows which have been pushed together, even if the number of sliding bows used is reduced to a number, for example four or six, which opens up at least three quarters of the length of the loading platform when the sliding-bow folding top is open. Furthermore, the sliding-bow folding top according to the invention enables one-hand operation or at any rate one-person operation.

The use according to the invention of auxiliary bows, which are aligned in the manner of auxiliary hoops and are positioned at an acute angle to the sliding bows in a first operating position and are aligned parallel to the sliding bows in a second operating position, allows, on the one hand, a relatively great distance between the sliding bows and, on the other hand, when the sliding bows are pushed together, raising of the tarpaulin between the mutually adjacent sliding bows, approximately with the effect of folding which is directed upwards, with the result that the use of auxiliary bows brings about, on the one hand, a reduction in the number of sliding bows and, on the other hand, however, controlled folding of the tarpaulin at the same time.

In the interest of folding the tarpaulin in as problem-free a manner as possible when there are relatively great distances between adjacent sliding bows, provision is expediently furthermore made for each sliding bow to be provided on both sides with a respective auxiliary bow.

In a particular refinement, in order to initially enforce an upwardly directed folding of the upper region of the tarpaulin between the sliding bows, provision is made for the two auxiliary bows to be connected to the tarpaulin. Furthermore, the two auxiliary bows can be mounted in a height-adjustable manner on the two limbs of the sliding bow by means of movable bearings.

The U-shaped sliding bows and the U-shaped auxiliary bows are preferably in each case of multi-part design and composed, for example, of at least three straight and two angular profiled material blanks. This enables the sliding bows and the auxiliary bows to be partly composed of the same blanks, resulting in there being limits on the need for stock-keeping and a large number of parts.

In order to simultaneously enforce likewise controlled folding of the side wall regions of the tarpaulin in the regions between adjacent sliding bows during opening of the sliding-bow folding top, provision is preferably made for the tarpaulin to be connected at its two lower longitudinal edges via semi-rigid elements to the sliding bows or to the roller carriages carrying the latter. For this purpose, a device for enforcing controlled folding of the side wall regions of the tarpaulin may be designed in such a manner that mutually adjacent sliding bows are connected to one another by means of wire-rope bows fixed to the roller carriages assigned to the sliding bows, that the tarpaulin is provided at the lower end, in each case over part of the maximum possible distance between two adjacent sliding bows, with a hollow hem, and that furthermore the wire-rope bows, which connect the adjacent sliding bows to one another, reach through the hollow-hem sections formed in the region of the lower longitudinal edges of the tarpaulin.

In the region of the fastening of the wire-rope bows to the roller carriages or sliding bows, the tarpaulin is preferably provided in each case with a length region which is free of the hollow hem and whose length is sufficient in order to enforce folding which is directed outwards with respect to the loading platform, the wire-rope bows furthermore being assigned deflecting elements in order to enforce a curved deflection.

In order to obtain a certain sealing of the tarpaulin structure or sliding folding top downwards, provision is expediently made for the wire-rope bows to be fastened in each case at their lower side to the roller carriages, in particular in such a manner that a type of labyrinth seal is produced between the longitudinal side of the loading platform and the tarpaulin.

In order to ensure the absolute rigidity of at least the movable end bow, this rigidity being absolutely necessary in order to obtain one-man operation, in an advantageous further design of the sliding-bow folding top provision is furthermore made for the two end bows of the folding top each to comprise two U-shaped bows which are made of tubular material and are connected to one another via a multiplicity of spacer plates, the sheet-metal material sections connecting the tubular-material bows to one another having a trapezoidal profile cross-sectional shape whose profile depth is at most the same size as, preferably smaller than, the diameter of the tubular-material bows, and the spacer plates furthermore being connected to the tubular-material bows by means of welding.

The movable end bow of the sliding-bow folding top can advantageously be locked in its position opposite the loading platform, which position corresponds to the closed folding top, by means of at least one pivoting bar, it being possible, however, also for an arrangement of pivoting bars on both sides with respect to the loading platform to be expedient, in particular if the two pivoting bars are connected to one another by means of a shaft or the like arranged below the loading-platform surface, and can therefore be operated from just one side of the loading platform.

The pivoting bar or bars is/are expediently also used at the same time as driving means for tensioning the folding top by the pivoting bar or bars, on entry into their locking position, forcing a rearwardly directed tensioning movement of the movable end hoop or end bow. In detail, provision may be made for this that, in conjunction with the pivoting bar being formed as a hook-type bar and, in this connection, with the rear side of the pivoting bar being formed as a radial cam, an engaging recess, which is assigned to the pivoting bar, in a floor plate of the movable end bow has a shorter length than the maximum elevation of the radial cam.

In order to reinforce the system when the sliding-bow folding top is closed, an opposed means of supporting the movable end bow is assigned to all the forces, such as tarpaulin tensioning or wind pressure, which attempt to contact the folding top particularly during transit, the said supporting means simultaneously relieving the load on the roller carriages when the end bow is in its end position. In a preferred form of implementation of such a means of relieving the load on the system, provision is made for the movable end bow to be assigned wedge-type ramps which secure its locked end position and are inclined in such a manner that during unlocking of the movable end bow they form a run-off ramp in order to obtain an initial acceleration during opening of the folding top.

Furthermore, provision is preferably made for the movable end bow to be supported via two roller carriages on the running and guide rails which are arranged on the longitudinal sides of the loading platform and at the same time form load-bearing elements of the loading-platform frame.

In an expedient supplementation of a sliding-bow folding top, a tried and tested driving device is provided for the movable end bow, which driving device can be characterized in a simple embodiment in that the movable end bow is assigned a preferably manually operable driving device which comprises a driving pinion, which can be driven by means of a crank, and a rack arranged on at least one of the running and guide rails.

Further advantages and features of the invention emerge from the following description.

BRIEF DESCRIPTION OF THE DRAWINGS

The invention is explained in greater detail below using a preferred exemplary embodiment and by reference to the attached drawings.

FIG. 6 shows part of a side view of the means of locking a movable end bow.

FIG. 9 shows a partially perspective view of the side-wall folding of the tarpaulin.

FIG. 10 shows part of a view from below of a roller carriage of the sliding-bow folding top.

DETAILED DESCRIPTION OF A PREFERRED EMBODIMENT

Figure 1:
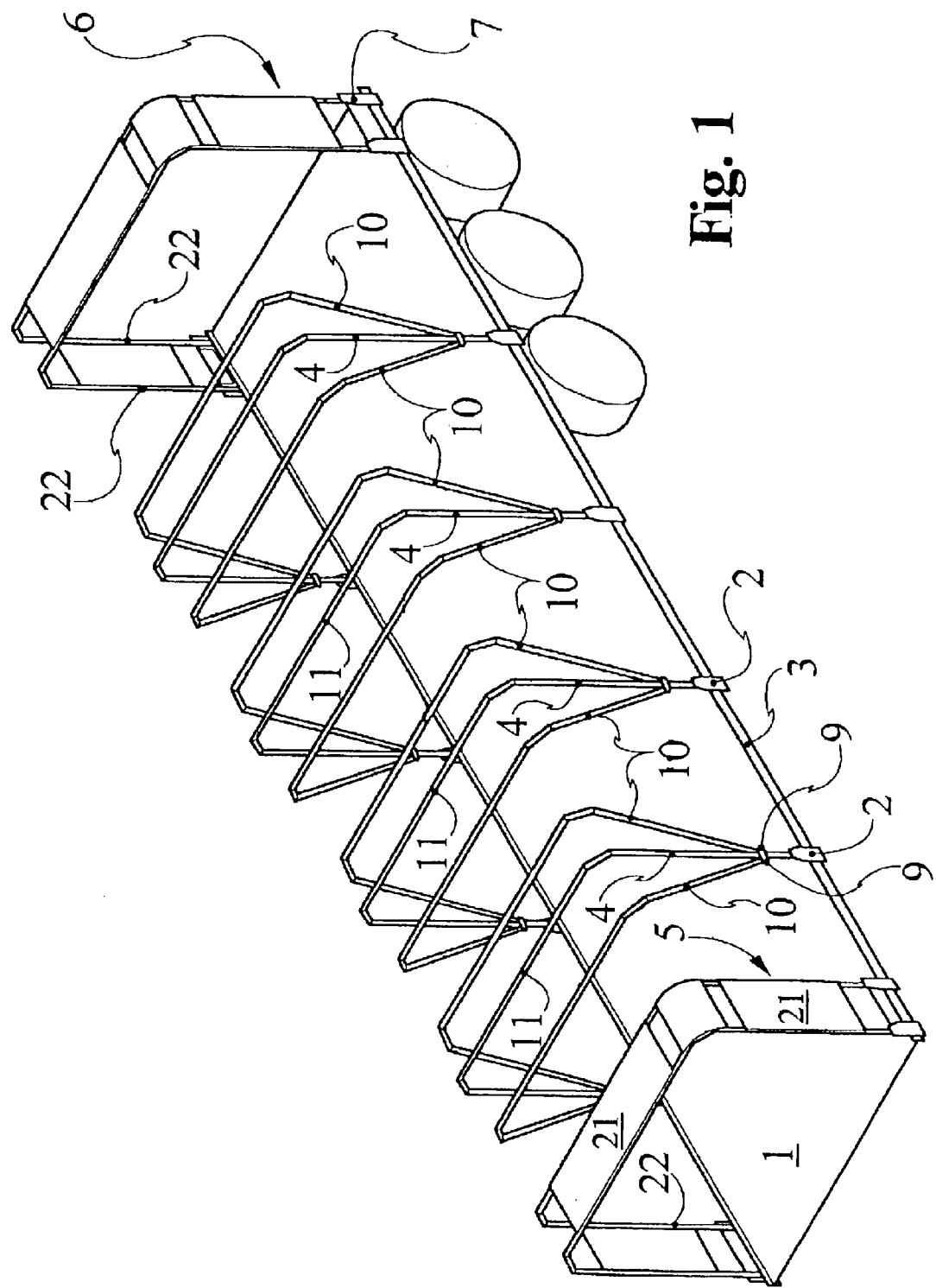
FIG. 1 shows a perspective view of a preferred exemplary embodiment of a sliding-bow folding top according to the invention.

The sliding-bow folding top which is shown in FIG. 1 for a semitrailer comprises a multiplicity of U-shaped sliding bows 4 which span the width of the loading platform 1 of the vehicle (not illustrated specifically in greater detail) and, for the opening and closing of the folding top, can be displaced by means of roller carriages 2 on running and guide rails 3 arranged along the two longitudinal sides of the loading platform 1, and also comprises a first end bow 5, which is arranged in a fixed manner at the one end of the loading platform 1, and a second end bow 6 which, for its part, is guided in a displaceable manner via roller carriages 7 on the running and guide rails 3. A securing or locking device 8 is also arranged on the loading platform 1.

Figure 2:
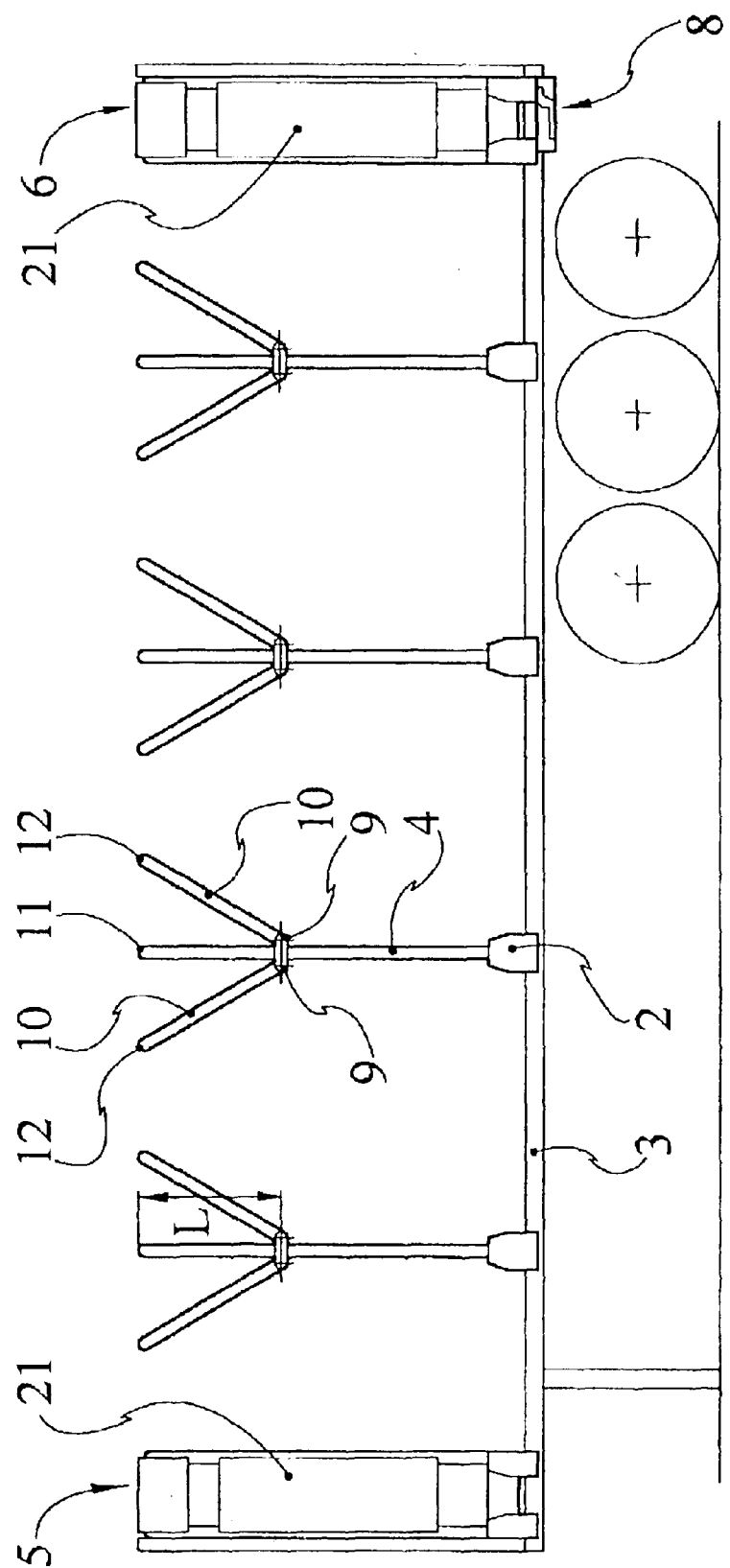
FIG. 2 shows a side view of the sliding-bow folding top from FIG. 1 in the closed state.

Connected to each of the sliding bows 4 are likewise U-shaped auxiliary bows 10 which can be pivoted through a limited angular range and in each case about an axis 9 parallel to the plane of the sliding bow 4. The limb length of the auxiliary bows 10 is greater here than the distance L of their axis of articulation 9 from the bow part 11 of the associated sliding bow 4. This limb length of the auxiliary bows 10 in relation to the position of the bow part 11 of an associated sliding bow 4 has the result that, when the folding top is closed, the bow parts 12 of the auxiliary bows 10 lie in one plane together with the bow parts 11 of the sliding bows 4, as can be seen in FIGS. 1 and 2, and during opening of the folding top, if the auxiliary bows 10 are folded against the sliding bows 4, the bow parts 12 of the auxiliary bows 10 are in a raised position with respect to the bow parts 11 of the sliding bows 4, the result being by restraint ordered folding of the upper region of a tarpaulin (not illustrated in detail), which region is fastened both to the bow parts 11 of the sliding bows 4 and to the bow parts 12 of the auxiliary bows 10.

Figure 4:
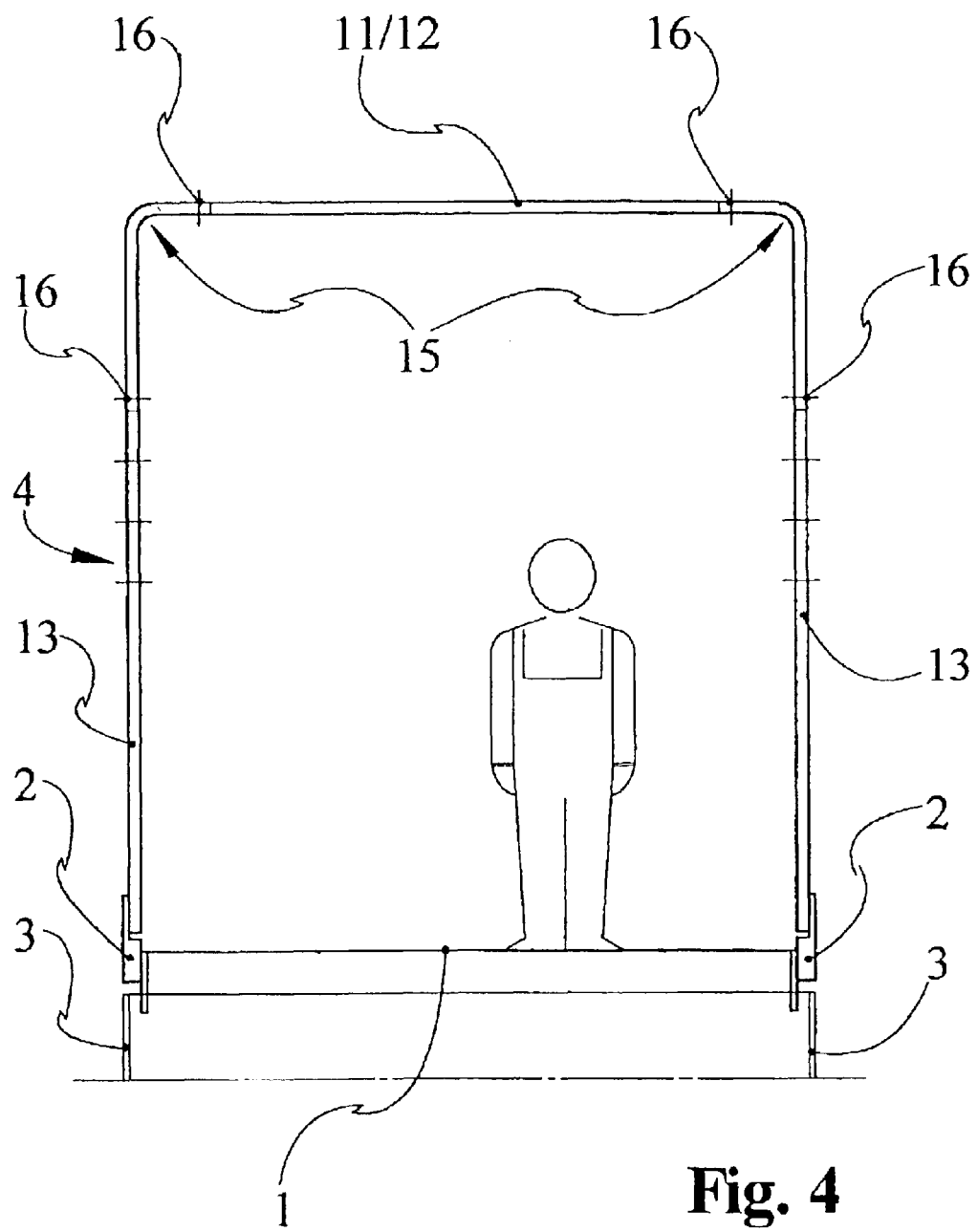
FIG. 4 shows a cross section through the sliding-bow folding top of FIGS. 1 to 3.
Figure 8:
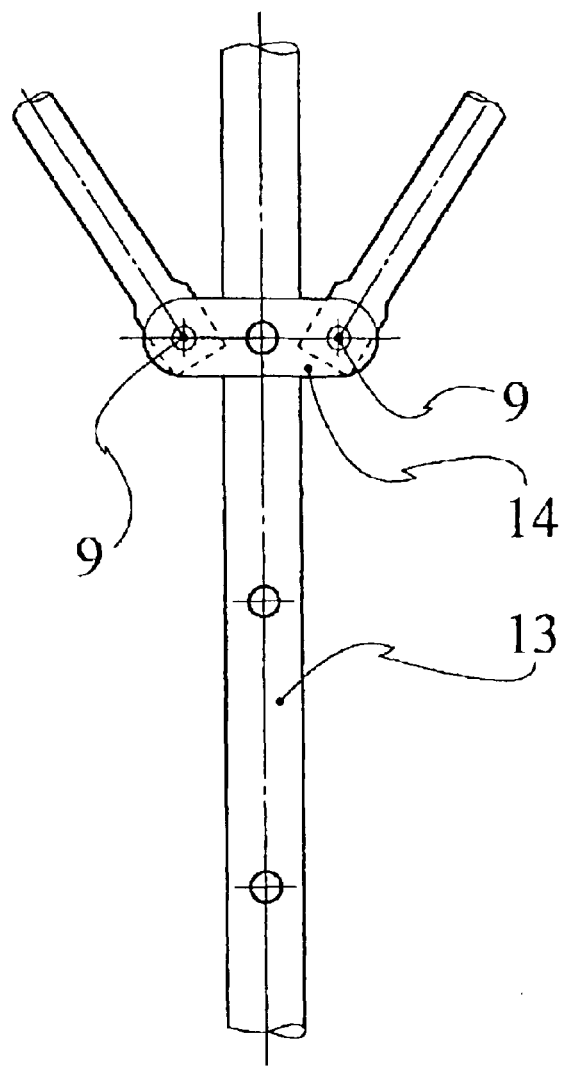
FIG. 8 shows a side view of a movable pivot bearing arrangement for auxiliary bows.
Figure 7:
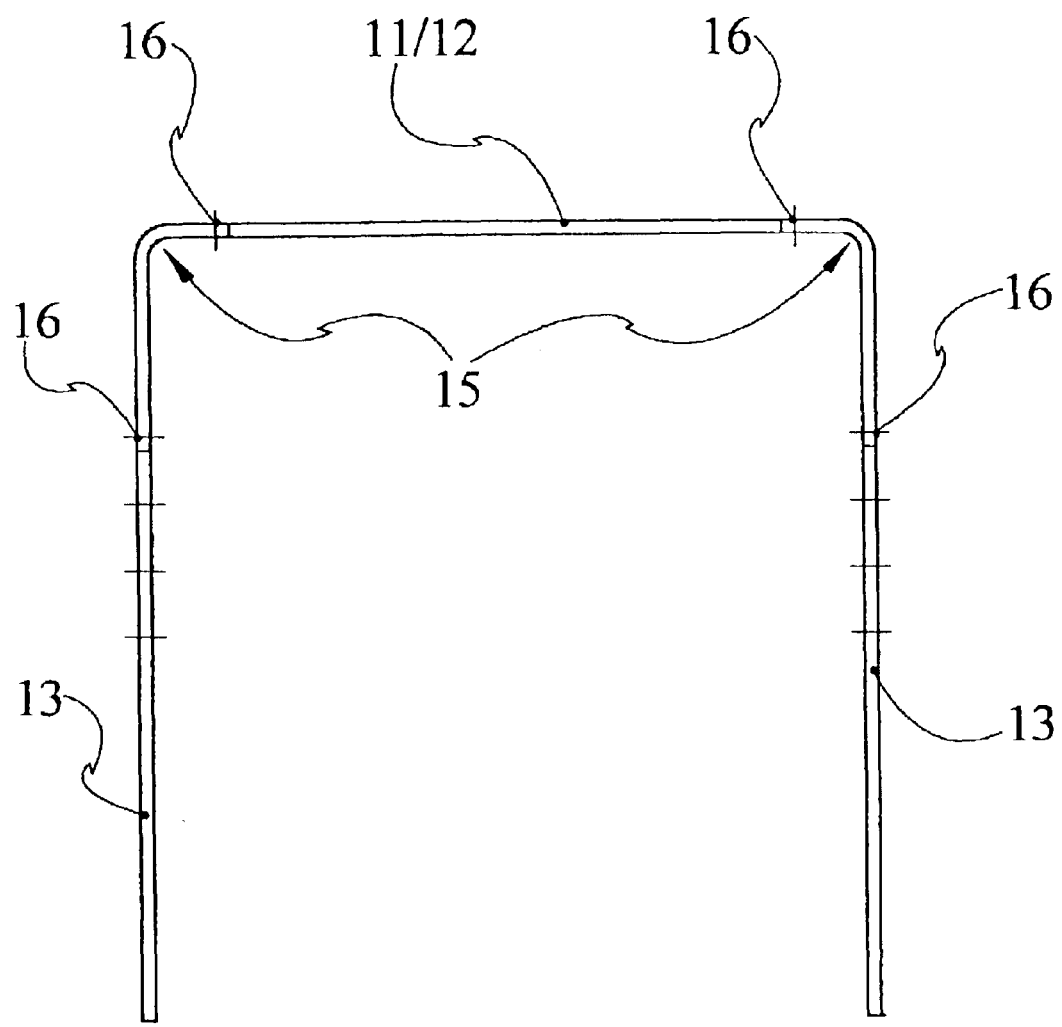
FIG. 7 shows an end view of a multipart bow of the sliding-bow folding top.

As can be seen in particular from FIG. 8, the two auxiliary bows 10 are mounted on the two limbs of each sliding bow 4 in each case by means of bearings 14, which are supported in a movable manner with regard to their height position on the limbs 13 of the sliding bows 4. The sliding bows 4 and the U-shaped auxiliary bows 10 are in each case of multipart design and in each case comprise three straight profiled material blanks forming the limbs 13 and the bow parts 11 or 12, and in each case two angular corner parts 15, as can be seen in particular from FIGS. 4 and 7. It can furthermore also be seen from FIGS. 4 and 7 that the parts of the U-shaped bows 4 and 10 are connected to one another via releasable means 16.

In order to enforce likewise controlled folding of the side wall regions of a tarpaulin 18, wire-rope bows 17 are arranged between the roller carriages 2 of adjacent sliding bows 4, as is illustrated in particular in FIG. 10, and they are in each case fastened to the lower side of the roller carriage 2. The wire-rope sections 17 form semi-rigid elements here and are restricted with regard to their length to the maximum permissible distance between two adjacent roller carriages 2. The tarpaulin 18, which is partially indicated in FIGS. 9 and 10, is provided in some sections at the lower end, in each case over part of the maximum permissible distance between two adjacent roller carriages 2, with a hollow hem 19 through which the wire-rope bows 17, which connect the adjacent roller carriages 2 to one another, reach. In the region of the fastening of the wire-rope bows 17 to the roller-carriage lower sides, the tarpaulin 18 is provided in each case with a length region 20 which is free of the hollow hem and whose length is sufficient for enforcing folding which is directed outwards with respect to the loading platform by means of the wire-rope bows 17.

Figure 5:
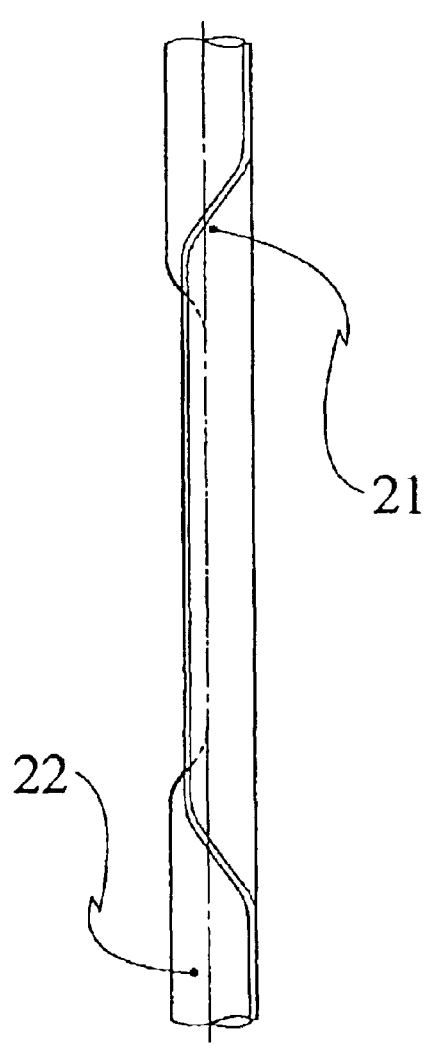
FIG. 5 shows part of a view of an end bow.

The two end bows 5 and 6 of the folding top are in each case designed as a torsionally rigid unit and each comprise two U-shaped bows 22 which are made of tubular material and are connected to one another via a multiplicity of spacer plates 21, in which case, as can be seen in particular from FIG. 5, the sheet-metal material sections 21 which connect the tubular material bows 22 to one another have a trapezoidal profile cross-sectional shape, and the profile depth of the trapezium is less than the diameter of the tubular material bows. The spacer plates are furthermore connected to the tubular material bows 22 by means of welding.

Figure 3:
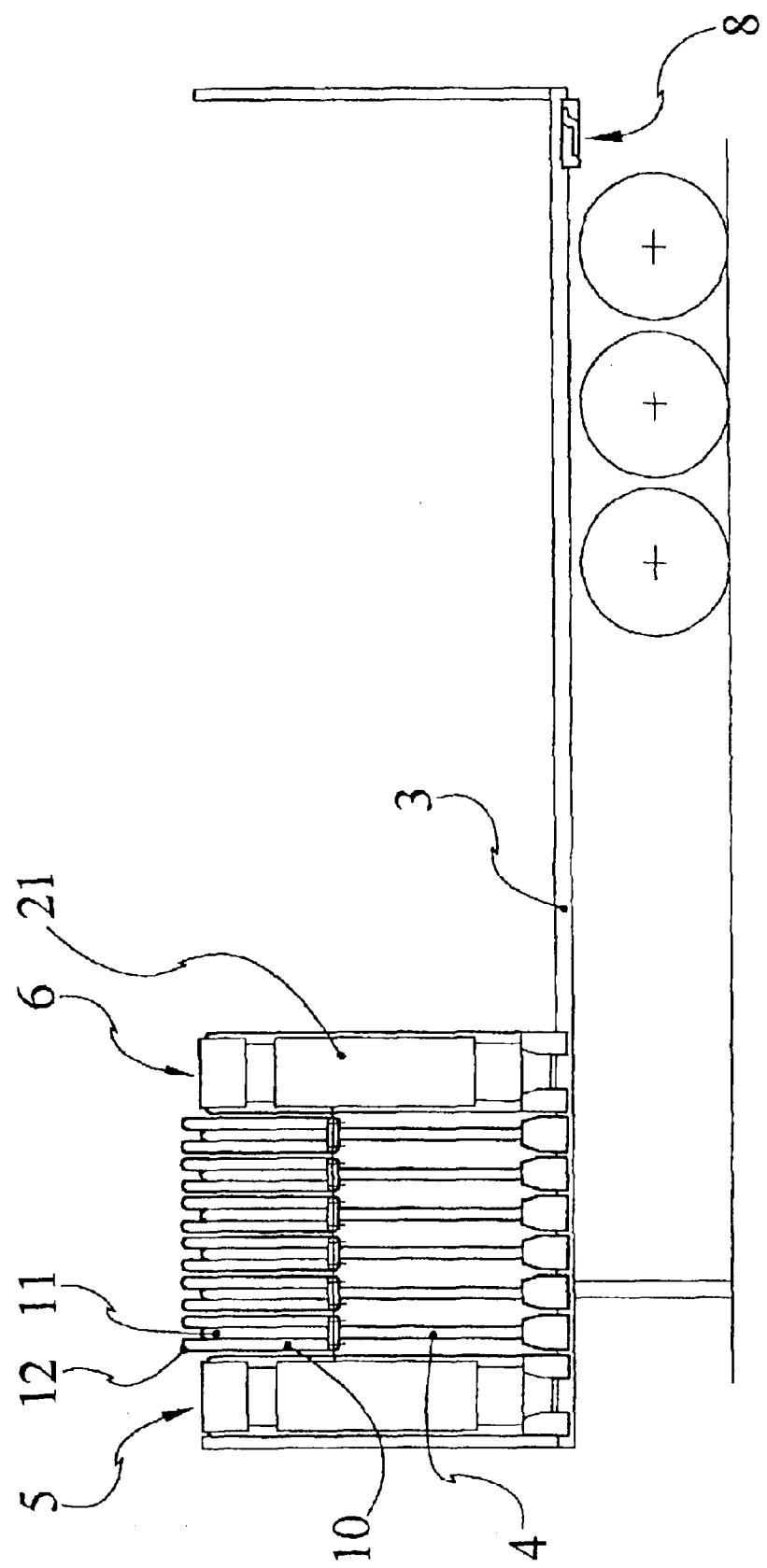
FIG. 3 shows a side view of the sliding-bow folding top from FIGS. 1 and 2 in the open state.

As can be seen from FIG. 6, in which the securing and locking device 8 from FIG. 3 is illustrated on an enlarged scale, the movable end bow 6 of the sliding-bow folding top can be locked in its position relative to the loading platform 1, which position corresponds to the closed folding top, by means of a pivoting bar 23 which is formed as a hook-type bar. The pivoting bar 23 is coupled to a crosspiece 25 of the loading-platform frame in a manner such that it can pivot about an axis 24 and can be actuated by means of a hand lever 26. The pivoting bar is assigned an engaging recess 27 in a floor plate 28 of the movable end bow 6.

Figure 11:
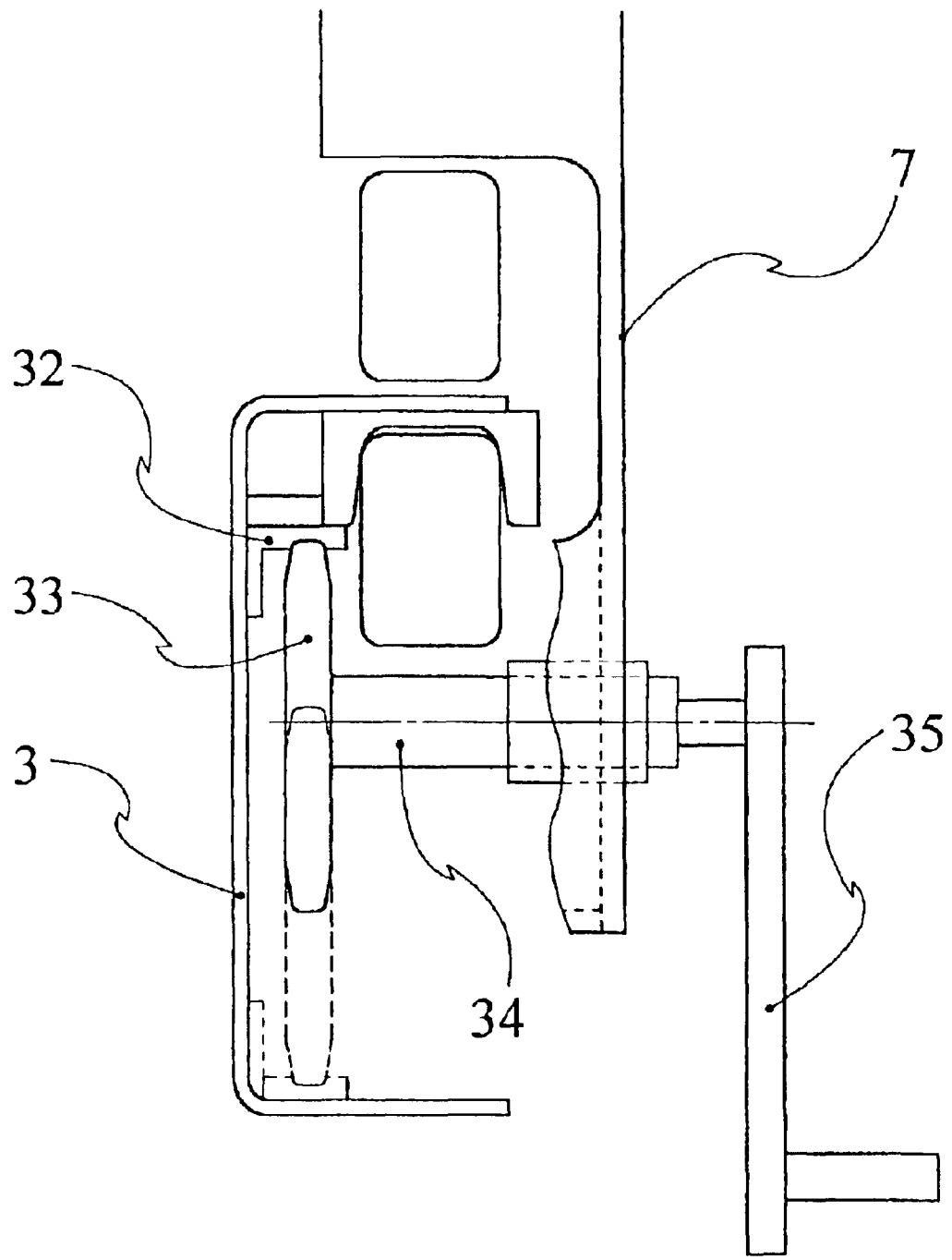
FIG. 11 shows a schematic cross section through a driving device for a movable end bow of the sliding-bow folding top.

So that the pivoting bar 23 is able, as it enters into its locking position, to enforce a rearwardly directed displacing or tensioning movement of the movable end bow 6, in conjunction with the rear side 29 of the pivoting bar 23 being formed as a radial cam, the length of the engaging recess 27, which is assigned to the pivoting bar 23, in the floor plate 28 of the movable end bow 6 is shorter than the maximum elevation of the radial cam 29 in such a manner that the pivoting bar 23 enforces, as a function of its direction of movement, movement of the end bow 6 either forwards or rearwards, The movable end bow is assigned wedge-type ramps 30, 31 which secure its locked end position and are inclined in opposite directions and in such a manner that during the unlocking of the movable end bow 6 they form a run-off ramp in order to obtain an initial acceleration during the opening of the folding top. It can be seen in detail from FIG. 11 that the movable end bow 6 is supported via two roller carriages 7 on the running and guide rails 3. As can be seen in particular from FIG. 11, the movable end bow 6 is assigned a manually actuable driving device which essentially comprises a rack 32, which is fastened lying on the inside in or on the running and guide rail 3, and a driving pinion 33 which meshes with the latter, the driving pinion 33 being fastened in a rotationally secure manner on a shaft 34 which is mounted on the one roller carriage 7, and the shaft 34 being connected at the other end in a rotationalty secure manner to a crank handle 35.

What is claimed is:

1. A sliding-bow folding top for vehicles comprising:
   a loading platform of a vehicle,
   a first end bow,
   a second end bow,
   a plurality of U-shaped sliding bows spanning a width of the loading platform of said vehicle, the sliding bows comprising bow parts defining an upper boundary, said sliding bows and at least one of said first end bow and said second end bow being displaceable in a longitudinal direction of said loading platform for opening and closing of the folding top,
   a tarpaulin carried on said bow parts, the tarpaulin, when the folding top is closed, covering the loading platform of said vehicle, and
   at least one U-shaped auxiliary bow arranged on one sliding bow of said plurality of sliding bows, the auxiliary bow being pivotable through a limited angular range about an axis of articulation parallel to a plane of said sliding bow, said auxiliary bow having a limb length being greater than a distance between the axis of articulation and said bow part of the one sliding bow,
   wherein the axis of articulation is at a region of the middle of the one sliding bow.

2. The sliding-bow folding top according to claim 1 wherein each sliding bow is provided on both sides with a respective auxiliary bow.

3. The sliding-bow folding top according to claim 1 wherein said at least one auxiliary bow is connected to said tarpaulin.

4. The sliding-bow folding top according to claim 1 wherein one of said first end bow and said second end bow is arranged in a fixed manner on an end of the loading platform.

5. The sliding-bow folding top according to claim 1 wherein said at least one of said first end bow and said second end bow being displaceable is assigned to at least one locking device, said at least one locking device being arranged at an end of said loading platform.

6. The sliding-bow folding top according to claim 1 wherein each sliding bow of the plurality of sliding bows comprises rollers being displaceable on guide rails arranged along two longitudinal sides of said loading platform.

7. The sliding-bow folding top according to claim 1 wherein each sliding bow of the plurality of sliding bows comprises roller carriages being displaceable on guide rails arranged along two longitudinal sides of said loading platform.

8. The sliding-bow folding top according to claim 1 wherein the first end bow and the second end bow each comprise two U-shaped tubular-material bows, said two U-shaped tubular-material bows being connected to one another via a plurality of spacer plates, said spacer plates being made of sheet-metal material sections and having a trapezoidal profile cross-section shape, wherein a profile depth of said spacer plates is a same size or smaller than a diameter of said tubular-material bows, and wherein said spacer plates are welded to said tubular-material bows.

9. The sliding-bow folding top according to claim 8 wherein said at least one of said first end bow and said second end bow being displaceable is supported via two roller carriages on said guide rails, said guide rails defining load-bearing elements of a frame of the loading platform.

10. The sliding-bow folding top according to claim 1 wherein said U-shaped sliding bows and said U-shaped auxiliary bows are in each case of multipart design and in each case comprise at least three straight and two angular profiled material blanks.

11. The sliding-bow folding top according to claim 1 wherein said at least one auxiliary bow is mounted in a height-adjustable manner on limbs of said sliding bow by a movable bearing.

12. The sliding-bow folding top according to claim 1 wherein the axis of articulation is arranged at two thirds of the height of the sliding bow.

13. The sliding-bow folding top according to claim 1 further comprising a driving device having a driving pinion drivable using a crank and rack arranged on at least one guide rail on the loading platform, the driving device for driving said at least one of said first end bow and said second end bow being displaceable.

14. The sliding-bow folding top according to claim 13 wherein the driving device is manually-operable.

15. The sliding-bow folding top according to claim 1 wherein at least one of said first end bow and said second end bow being displaceable can be locked in a position corresponding to the folding top in a closed position relative to said loading platform using at least one pivoting bar.

16. The sliding-bow folding top according to claim 15 wherein said pivoting bar is formed as a hook-type bar, wherein a rear side of said pivoting bar is formed as a radial cam, wherein a floor plate of said second end bow has an engaging recess assigned to said pivoting bar, and wherein said engaging recess has a shorter length than a maximum elevation of said radial cam.

17. The sliding-bow folding top according to claim 1 further comprising wedge-type ramps, at least one of said first end bow and said second end bow being displaceable being assigned the wedge-type ramps to secure a locked end position, said wedge-type ramps being inclined in such a manner that during unlocking of said at least one of said first end bow and said second end bow being displaceable said wedge-type ramps form a run-off ramp in order to obtain an initial acceleration during opening of said folding top.

18. The sliding-bow folding top according to claim 1 wherein said tarpaulin comprises an arrangement for enforcing folding of the tarpaulin during opening of the folding top.

19. The sliding-bow folding top according to claim 18 wherein said arrangement for enforcing folding of the tarpaulin allows the tarpaulin to be lifted in a vicinity of the loading platform by an amount said at least one auxiliary bow lifts the tarpaulin.

20. The sliding-bow folding top according to claim 1 further comprising semi-rigid elements, said tarpaulin being connected at two lower longitudinal edges via the semi-rigid elements to one of said sliding bows and roller carriages carrying said sliding bows.

21. The sliding-bow folding top according to claim 1 further comprising wire-rope bows, mutually adjacent sliding bows of the plurality of sliding bows being connected to one another by the wire-rope bows fixed to roller carriages assigned to said sliding bows, and wherein said tarpaulin is provided at its lower end, in each case over part of a maximum possible distance between two adjacent sliding bows, with a hollow hem, and wherein said wire-rope bows reach through said hollow-ham of said tarpaulin.

22. The sliding-bow folding top according to claim 21 wherein said tarpaulin is provided with a length region which is free of said hollow-hem in the region of a fastening of said wire-rope bows to one of said roller can ages and said sliding bows, wherein said length region has a length sufficient in order to enforce folding which is directed outwards with respect to said loading platform, and wherein said wire-rope bows are assigned deflecting elements in order to enforce a curved deflection.

23. The sliding-bow folding top according to claim 21, wherein said wire-rope bows are in each case fastened at their lower side to said roller carriages.

24. A sliding-bow folding top for vehicles comprising:
a loading platform of a vehicle,
a first end bow,
a second end bow,
a plurality of U-shaped sliding bows spanning a width of the loading platform of said vehicle, the sliding bows comprising bow parts defining an upper boundary, said sliding bows and at least one of said first end bow and said second end bow being displaceable in a longitudinal direction of said loading platform for opening and closing of the folding top,
a tarpaulin carried on said bow parts, the tarpaulin, when the folding top is closed, covering the loading platform of said vehicle,
at least one U-shaped auxiliary bow arranged on one of said sliding bows, the auxiliary bow being pivotable through a limited angular range about an axis of articulation parallel to a plane of said sliding bow, wherein said auxiliary bow having a limb length being greater than a distance between the axis of articulation and said bow part of the one sliding bow,
wherein said tarpaulin comprises an arrangement for enforcing folding of the tarpaulin during opening of the folding top to at least in part compensate for a lifting of the tarpaulin due to the at least one auxiliary bow being pivoted toward the one sliding bow and protruding over a height of the one sliding bow, said arrangement for enforcing folding of the tarpaulin comprises deflecting elements in order to enforce a curved deflection of the tarpaulin.

25. The sliding-bow folding top according to claim 24 wherein said at least one auxiliary bow is connected to said tarpaulin such that the tarpaulin is lifted to protrude over the closed upper tarpaulin level and wherein said arrangement for enforcing folding of the tarpaulin allows the tarpaulin to be lifted in vicinity of the loading platform by an amount said at least one auxiliary bow lifts the tarpaulin.

26. The sliding-bow folding top according to claim 24 wherein said arrangement for enforcing folding of the tarpaulin comprises semi-rigid elements connected to a lower longitudinal edge of the tarpaulin between adjacent sliding bows.

27. The sliding-bow folding top according to claim 26 wherein said semi-rigid elements are connected at each of their two ends to adjacent sliding bows and end bows.

28. The sliding-bow folding top according to claim 26 wherein said semi-rigid elements are made of wire-rope bows, and wherein said tarpaulin is provided at its lower end, in each case over part of the maximum possible distance between two adjacent sliding bows, with a hollow hem, and wherein said wire-rope bows reach through said hollow-hem of said tarpaulin.

29. The sliding-bow folding top according to claim 26 wherein said semi-rigid elements are connected to roller carriages of the sliding bows.

30. The sliding-bow folding top according to claim 24 wherein each sliding bow is provided on both sides with a respective auxiliary bow.

31. The sliding-bow folding top according to claim 24 wherein the axis of articulation is arranged at an upper portion of the sliding bow.

32. The sliding-bow folding top according to claim 24 wherein said at least one auxiliary bow is mounted in a height-adjustable manner on limbs of said sliding bow by a movable bearing.

33. The sliding-bow folding top according to claim 24 wherein said at least one of said first end bow and said second end bow being displaceable is assigned to at least one locking device, said at least one locking device being arranged at an end of said loading platform.

34. The sliding-bow folding top according to claim 24 wherein each sliding bow of the plurality of sliding bows comprises rollers being displaceable on guide rails arranged along two longitudinal sides of said loading platform.

35. The sliding-bow folding top according to claim 24 wherein the first end bow and the second end bow each comprise two U-shaped tubular-material bows.

36. The sliding-bow folding top according to claim 24 wherein an auxiliary bow part of said auxiliary bow is, when the folding top is closed, arranged in a same plane as said bow part of said sliding bow, and wherein said auxiliary bow part, when the folding top is opened, is arranged in an elevated plane higher than the same plane such that the tarpaulin is arranged beyond said same plane.

37. The sliding-bow folding top according to claim 24 further comprising a driving device comprising a driving pinion drivable by a crank and a rack arranged on at least one guide rail of the loading platform, the driving device driving said at least one of said first end bow and said second end bow being displaceable.

38. The sliding-bow folding top according to claim 24 wherein said at least one of said first end bow and said second end bow being displaceable can be locked in a position corresponding to the closed folding top relative to said loading platform using at least one pivoting bar, wherein said pivoting bar is fanned as a hook-type bar, wherein a rear side of said pivoting bar is formed as a radial cam, wherein a floor plate of said second end bow has an engaging recess assigned to said pivoting bar, and wherein said engaging recess has a shorter length than a maximum elevation of said radial cam.

39. The sliding-bow folding top according to claim 24 further comprising wedge-type ramps, at least one of said first end bow and said second end bow being displaceable by the wedge-type ramps which secure its locked end position, said wedge-type ramps being inclined in such a manner that during unlocking of said at least one of said first end bow and said second end bow being displaceable said wedge-type ramps form a run-off ramp in order to obtain an initial acceleration during opening of said folding top.

40. A sliding-bow folding top for vehicles comprising:
a loading platform of a vehicle,
a first end bow,
a second end bow,
a plurality of U-shaped sliding bows spanning a width of the loading platform of said vehicle, the sliding bows comprising bow parts defining an upper boundary, said sliding bows and at least one of said first end bow and said second end bow being displaceable in a longitudinal direction of said loading platform for opening and closing of the folding top,
a tarpaulin carried on said bow parts, the tarpaulin, when the folding top is closed, covering the loading platform of said vehicle,
at least one U-shaped auxiliary bow arranged on one of said sliding bows, the auxiliary bow being pivotable through a limited angular range about an axis of articulation parallel to a plane of said sliding bow, said auxiliary bow having a limb length being greater than a distance between the axis of articulation and said bow part of the one sliding bow,
wherein the limb length of the auxiliary bow is shorter than half a height of the one sliding bow.

41. A sliding-bow folding top for vehicles comprising:
a loading platform of a vehicle,
a first end bow,
a second end bow,
a plurality of U-shaped sliding bows spanning a width of the loading platform or said vehicle, the sliding bows comprising bow parts defining an upper boundary, said sliding bows and at least one of said first end bow and said second end bow being displaceable in a longitudinal direction of said loading platform for opening and closing of the folding top,
a tarpaulin carried on said bow parts, the tarpaulin, when the folding top is closed, covering the loading platform of said vehicle,
at least one U-shaped auxiliary bow arranged on one of said sliding bows, the auxiliary bow being pivotable through a limited angular range about an axis of articulation parallel to a plane of said sliding bow, said auxiliary bow having a limb length being greater than a distance between the axis of articulation and said bow part of the one sliding bow,
wherein a device for enforcing controlled folding of the tarpaulin during opening of the folding top in provided in a lower region of the one sliding bow, and
wherein the axis of articulation is arranged in an upper region of the one sliding bow.

42. The sliding-bow folding top according to claim 41 wherein the tarpaulin is connected to a distal end of said at least one auxiliary bow, and wherein the tarpaulin in the vicinity of a lower side end is connected to the device for enforcing controlled folding.

43. The sliding-bow folding top according to claim 41 wherein each sliding bow is provided on both sides with a respective auxiliary bow, and wherein the distance between adjacent facing auxiliary bows of adjacent sliding bows is less than the limb length of said auxiliary bows.

44. The sliding-bow folding top according to claim 41 wherein a distance between adjacent sliding bows is greater than the limb length of said auxiliary bows.

45. The sliding-bow folding top according to claim 41 wherein said at least one auxiliary bow is mounted in a height-adjustable manner on limbs of said sliding bow by a movable bearing.

46. A sliding-bow folding top for vehicles comprising:

a loading platform of a vehicle, a first end bow, a second end bow, a plurality of U-shaped sliding bows spanning a width of the loading platform of said vehicle, the sliding bows comprising bow parts defining an upper boundary, said sliding bows and at least one of said first end bow and said second and bow being displaceable in a longitudinal direction of said loading platform for opening and closing of the folding top, a tarpaulin carried on said bow pans, the tarpaulin, when the folding top is closed, covering the loading platform of said vehicle, wherein said at least one of said first end bow and said second end bow being displaceable can be locked in a position corresponding to the closed folding top relative to said loading platform and is assigned wedge-type ramps which secure its locked end position, said wedge-type ramps being inclined in such a manner that during unlocking of said as least one of said first end bow and said second end bow being displaceable said wedge-type ramps form a run-off ramp in order to obtain an initial acceleration during opening of said folding top.

47. The sliding-bow folding top according to claim 46 further comprising at least one U-shaped auxiliary bow arranged on one of said sliding bows, the auxiliary bow being pivotable through a limited angular range about an axis of articulation parallel to a plane of said sliding bow, said auxiliary bow having a limb length being greater than a distance between the axis of articulation and said bow part of the one sliding bow, and wherein an arrangement for enforcing folding of the tarpaulin during opening of the folding top is provided in a lower region of the one sliding bow.

* * * * *